(12) United States Patent
Nammi

(10) Patent No.: US 11,576,197 B2
(45) Date of Patent: *Feb. 7, 2023

(54) FACILITATING IMPROVED PERFORMANCE OF MULTIPLE DOWNLINK CONTROL CHANNELS IN ADVANCED NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/158,243

(22) Filed: Jan. 26, 2021

(65) Prior Publication Data

US 2021/0153240 A1 May 20, 2021

Related U.S. Application Data

(63) Continuation of application No. 16/277,733, filed on Feb. 15, 2019, now Pat. No. 10,945,281.

(51) Int. Cl.
*H04W 4/00* (2018.01)
*H04W 72/12* (2009.01)
(Continued)

(52) U.S. Cl.
CPC ..... *H04W 72/1289* (2013.01); *H04L 27/2627* (2013.01); *H04W 88/02* (2013.01)

(58) Field of Classification Search
USPC .... 370/229, 230, 230.1, 235, 236, 252, 328, 370/329, 343, 345, 431, 433, 437, 464,
(Continued)

(56) References Cited

U.S. PATENT DOCUMENTS 6,061,549 A 5/2000 Labonte et al.
8,340,043 B2 12/2012 Suzuki et al.
(Continued)

FOREIGN PATENT DOCUMENTS

WO 2013/022267 A2 2/2013

OTHER PUBLICATIONS

Notice of Allowance dated Oct. 30, 2020 for U.S. Appl. No. 16/277,733, 69 pages.
(Continued)

*Primary Examiner* — Nguyen H Ngo
(74) *Attorney, Agent, or Firm* — Amin, Turocy & Watson, LLP

(57) ABSTRACT

Facilitating improved performance of multiple downlink control channels in advanced networks (e.g., 4G, 5G, 6G, and beyond) is provided herein. Operations of a system can comprise scheduling multiple data traffic channels for a user equipment device. Scheduling the multiple data channels can comprise scheduling a first data traffic channel of the multiple data traffic channels based on a legacy scheduling procedure and scheduling a second data traffic channel of the multiple data traffic channels based on an iterative procedure. The operations can also comprise transmitting, to the user equipment device, first information via multiple downlink control channels and transmitting, to the user equipment device, second information via the multiple data traffic channels.

20 Claims, 12 Drawing Sheets

(51) Int. Cl.
*H04L 27/26* (2006.01)
*H04W 88/02* (2009.01)

(58) Field of Classification Search
USPC ......................................................... 370/465
See application file for complete search history.

(56) References Cited

U.S. PATENT DOCUMENTS

| | | | |
|---|---|---|---|
| 9,048,885 | B2 | 6/2015 | Kim et al. |
| 9,197,385 | B2 | 11/2015 | Khoshnevis et al. |
| 9,331,828 | B2 | 5/2016 | Kim et al. |
| 9,385,853 | B2 | 7/2016 | Zhou et al. |
| 9,397,796 | B2 | 7/2016 | Papasakellariou |
| 9,537,552 | B2 | 1/2017 | Li et al. |
| 9,572,168 | B2 | 2/2017 | Bergstrom et al. |
| 9,609,642 | B2 | 3/2017 | Kia et al. |
| 9,621,318 | B2 | 4/2017 | Lee et al. |
| 9,635,618 | B2 | 4/2017 | Seo |
| 9,713,165 | B2 | 7/2017 | Nammi |
| 9,713,189 | B2 | 7/2017 | Lu et al. |
| 9,749,999 | B2 | 8/2017 | ElArabawy et al. |
| 9,769,800 | B2 | 9/2017 | Seo et al. |
| 9,769,807 | B2 | 9/2017 | Jongren et al. |
| 9,788,322 | B2 | 10/2017 | Wong et al. |
| 9,843,942 | B2 | 12/2017 | Cheng et al. |
| 9,867,223 | B2 | 1/2018 | Saiwai |
| 9,887,801 | B2 | 2/2018 | Papasakellariou |
| 9,900,872 | B2 | 2/2018 | Liu et al. |
| 9,912,451 | B2 | 3/2018 | Berggren et al. |
| 9,973,955 | B2 | 5/2018 | Liu et al. |
| 10,251,075 | B1 | 4/2019 | Panchal |
| 10,833,897 | B2 | 11/2020 | Nammi et al. |
| 2005/0249180 | A1* | 11/2005 | Murakami ........ H04W 72/0453 370/345 |
| 2008/0081655 | A1 | 4/2008 | Shin et al. |
| 2010/0239040 | A1 | 9/2010 | Beluri et al. |
| 2011/0110341 | A1 | 5/2011 | Yuk et al. |
| 2011/0149900 | A1* | 6/2011 | Clima .................. H04W 72/10 370/329 |
| 2012/0314808 | A1 | 12/2012 | Taoka et al. |
| 2014/0044206 | A1 | 2/2014 | Nammi et al. |
| 2014/0064214 | A1 | 3/2014 | Papasakellariou et al. |
| 2014/0133471 | A1 | 5/2014 | Nammi et al. |
| 2014/0198677 | A1 | 7/2014 | Xu et al. |
| 2014/0341096 | A1 | 11/2014 | Ko et al. |
| 2014/0341320 | A1 | 11/2014 | Hua et al. |
| 2015/0023188 | A1 | 1/2015 | Das et al. |
| 2015/0029952 | A1 | 1/2015 | Huang |
| 2015/0087346 | A1 | 3/2015 | Dahlman et al. |
| 2015/0124688 | A1 | 5/2015 | Xu et al. |
| 2015/0229373 | A1 | 8/2015 | Lee et al. |
| 2015/0304997 | A1 | 10/2015 | Park et al. |
| 2015/0372740 | A1 | 12/2015 | Ko et al. |
| 2016/0020847 | A1 | 1/2016 | Jitsukawa |
| 2016/0066345 | A1 | 3/2016 | Sun et al. |
| 2016/0081076 | A1 | 3/2016 | Zhang et al. |
| 2016/0119807 | A1 | 4/2016 | Sun et al. |
| 2016/0119926 | A1 | 4/2016 | Sahara et al. |
| 2016/0212458 | A1 | 7/2016 | Kwon et al. |
| 2016/0227521 | A1 | 8/2016 | Han et al. |
| 2016/0254878 | A1 | 9/2016 | Wang et al. |
| 2016/0337901 | A1 | 11/2016 | Hong et al. |
| 2016/0381583 | A1 | 12/2016 | Sawahashi et al. |
| 2017/0013599 | A1 | 1/2017 | Sun et al. |
| 2017/0034812 | A1* | 2/2017 | Deng .................. H04W 72/046 |
| 2017/0111899 | A1 | 4/2017 | Pan et al. |
| 2017/0126298 | A1 | 5/2017 | Einhaus et al. |
| 2017/0127448 | A1 | 5/2017 | Zhou et al. |
| 2017/0230994 | A1 | 8/2017 | You et al. |
| 2017/0244513 | A1 | 8/2017 | Pitakdumrongkija et al. |
| 2017/0290046 | A1 | 10/2017 | Sun et al. |
| 2017/0318495 | A1 | 11/2017 | Anjum et al. |
| 2017/0324454 | A1 | 11/2017 | Merkel et al. |
| 2018/0019852 | A1 | 1/2018 | Soldati et al. |
| 2018/0027527 | A1 | 1/2018 | Vitthaladevuni et al. |
| 2018/0027535 | A1 | 1/2018 | Guo et al. |
| 2018/0042028 | A1 | 2/2018 | Nam et al. |
| 2018/0063749 | A1 | 3/2018 | Islam et al. |
| 2018/0084572 | A1 | 3/2018 | You et al. |
| 2018/0092111 | A1 | 3/2018 | Chaudhuri et al. |
| 2018/0103483 | A1 | 4/2018 | Liu et al. |
| 2018/0131498 | A1 | 5/2018 | Chen et al. |
| 2018/0131598 | A1 | 5/2018 | Suzuki et al. |
| 2018/0213430 | A1 | 7/2018 | Yokomakura et al. |
| 2018/0098235 | A1 | 8/2018 | Bagher et al. |
| 2018/0310333 | A1 | 10/2018 | Akkarakaran et al. |
| 2018/0323946 | A1* | 11/2018 | Bendlin ................ H04L 5/001 |
| 2018/0324789 | A1 | 11/2018 | Park et al. |
| 2019/0036658 | A1 | 1/2019 | Kim et al. |
| 2019/0173541 | A1 | 6/2019 | Liu |
| 2019/0208436 | A1 | 7/2019 | Zhou et al. |
| 2019/0223162 | A1 | 7/2019 | Suzuki et al. |
| 2020/0100178 | A1 | 3/2020 | Kim et al. |

OTHER PUBLICATIONS

Non-Final Office Action received for U.S. Appl. No. 17/459,196 dated Apr. 21, 2022, 45 pages.
Notice of Allowance received for U.S. Appl. No. 17/459,196 dated May 13, 2022, 24 pages.
International Preliminary Report on Patentability for International Application No. PCT/US2019/030714 dated Dec. 30, 2020, 10 pages.
Final Office Action received for U.S. Appl. No. 16/010,068 dated Apr. 26, 2021, 46 pages.
Notice of Allowance received for U.S. Appl. No. 16/016,085 dated May 28, 2021, 55 pages.
Non-Final Office Action received for U.S. Appl. No. 16/010,068 dated Oct. 5, 2021, 19 pages.
International Preliminary Report on Patentability for International Application No. PCT/US2020/016257 dated Aug. 26, 2021, 9 pages.
International Search Report and Written Opinion received for PCT Application Serial No. PCT/US2019/030714 dated Jul. 19, 2019, 17 pages.
Nokia et al., "On the number of codewords in NR", URL: http://www.3gpp.org/ftp/Meetings_3GPP_SYNC/RAN1/Docs/, 3GPP TSG RAN WG1#88 bis, R1-1705952, Apr. 3-7, 2017, 7 pages.
Non-Final Office Action received for U.S. Appl. No. 16/010,068 dated Aug. 16, 2019, 39 pages.
Non-Final Office Action received for U.S. Appl. No. 16/016,085 dated May 30, 2019, 30 pages.
Final Office Action received for U.S. Appl. No. 16/016,085 dated Oct. 28, 2019, 27 pages.
Non-Final Office Action received for U.S. Appl. No. 16/016,085 dated Feb. 21, 2020, 29 pages.
Final Office Action received for U.S. Appl. No. 16/010,068 dated Mar. 3, 2020, 40 pages.
International Search Report and Written Opinion received for PCT Application Serial No. PCT/US2020/016257 dated May 15, 2020, 15 pages.
Nokia Networks, "0n reducing the number of DL control blind decodes", http://www.3gpp.org/ftp/tsg_ran/WG1_RL1/TSGR1_82/Docs/,R1-154467, Aug. 24-28, 2015, 6 pages.
Huawei et al., "Summary of AI: 7.2.8.2 Enhancements on Multi-TRP/Panel Transmission of Offline Discussion", http://www.3gpp.org/ftp/Meetings%5F3GPP%5FSYNC/RAN1/Docs/R1%2D1901371%2Ezip, R1-1901371, Jan. 21-25, 2019, 39 pages.
Lenovo et al., "Discussion of multi-panel transmission", http://www.3gpp.org/ftp/Meetings%5F3GPP%5FSYNC/RAN1/Docs/R1%2D1900386%2Ezip, R1-1900386, Jan. 21-25, 2019, 7 pages.
Non-Final Office Action received for U.S. Appl. No. 16/277,733 dated May 27, 2020, 71 pages.
Non-Final Office Action received for U.S. Appl. No. 16/010,068 dated Sep. 8, 2020, 36 pages.
Final Office Action received for U.S. Appl. No. 16/016,085 dated Aug. 21, 2020, 49 pages.

(56) References Cited

OTHER PUBLICATIONS

Non Final Office Action received for U.S. Appl. No. 16/016,085 dated Dec. 9, 2020, 54 pages.

* cited by examiner

FACILITATING IMPROVED PERFORMANCE OF MULTIPLE DOWNLINK CONTROL CHANNELS IN ADVANCED NETWORKS

RELATED APPLICATION

The subject patent application is a continuation of, and claims priority to, U.S. patent application Ser. No. 16/277,733, filed Feb. 15, 2019, and entitled "FACILITATING IMPROVED PERFORMANCE OF MULTIPLE DOWNLINK CONTROL CHANNELS IN ADVANCED NETWORKS," the entirety of which application is hereby expressly incorporated by reference herein.

TECHNICAL FIELD

This disclosure relates generally to the field of mobile communication and, more specifically, to Multiple Input, Multiple Output (MIMO) performance in wireless communication systems for advanced networks (e.g., 4G, 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
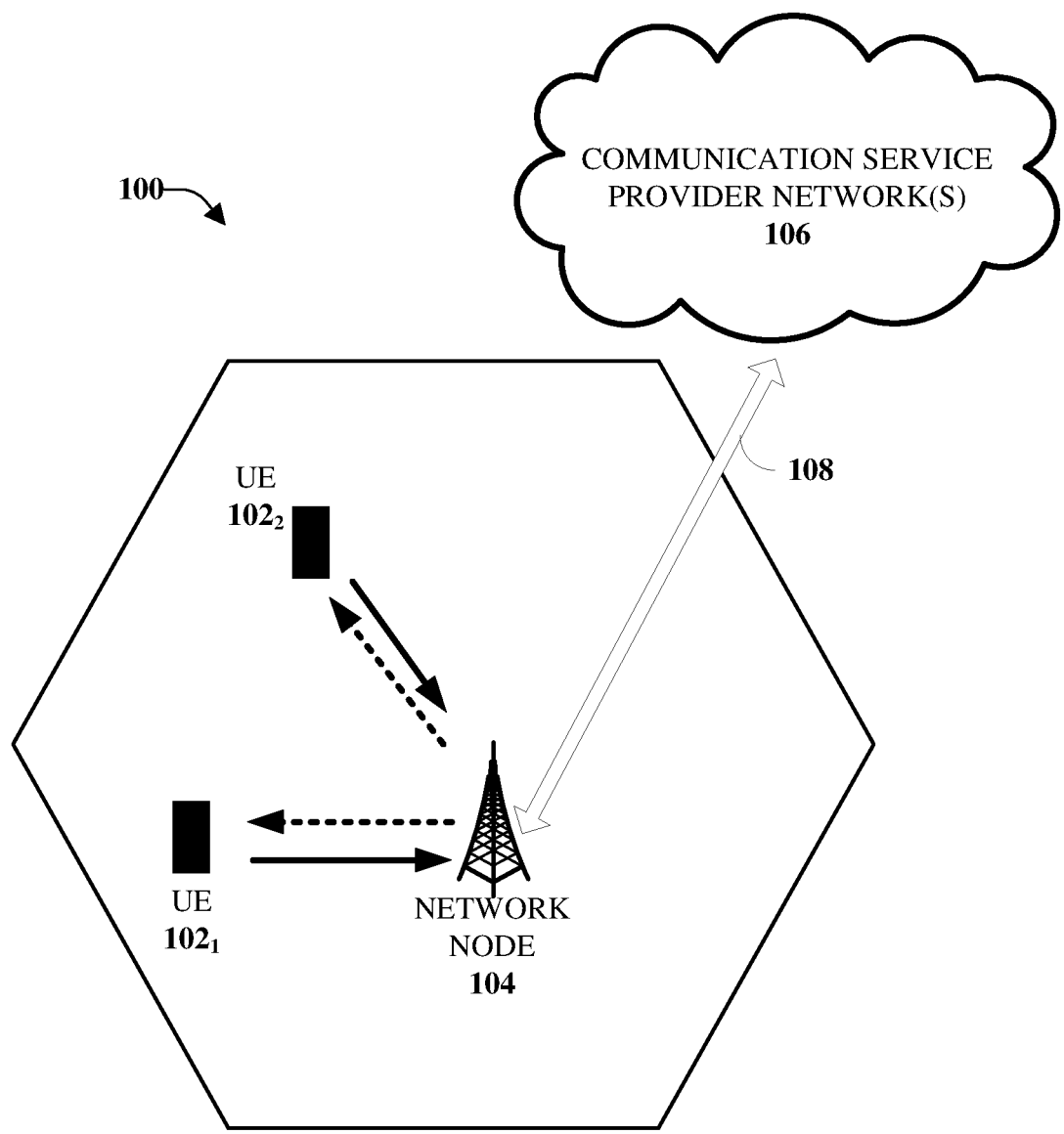
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, devices, methods, articles of manufacture, and other embodiments or implementations that can facilitate improved performance of Multiple Input, Multiple Output (MIMO) systems with multiple downlink controls channels for advanced networks.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE.

MIMO systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a ($N_t$,$N_r$) system, where $N_t$ denotes the number of transmit antennas and Nr denotes the number of receive antennas, the peak data rate multiplies with a factor of $N_t$ over single antenna systems in a rich scattering environment.

In one embodiment, a system can comprise a processor and a memory that stores executable instructions that, when executed by the processor, facilitate performance of operations. The operations can comprise scheduling multiple data traffic channels for a user equipment device. Scheduling the multiple data channels can comprise scheduling a first data traffic channel of the multiple data traffic channels based on a legacy scheduling procedure and scheduling a second data traffic channel of the multiple data traffic channels based on an iterative procedure. The operations can also comprise transmitting, to the user equipment device, first information via multiple downlink control channels and transmitting, to the user equipment device, second information via the multiple data traffic channels.

According to an implementation, scheduling the second data traffic channel of the multiple data traffic channels based on the iterative procedure can comprise selecting a lowest modulation and coding scheme from a group of modulation and coding schemes of a modulation and coding scheme set and using the lowest modulation and coding scheme as a current modulation and coding scheme.

Further to the above implementation, the operations can comprise determining expiration of a defined time interval and obtaining a hybrid automatic repeat request status of a first downlink control channel of the multiple downlink control channels based on the expiration. The operations can also comprise determining an updated modulation and coding scheme based on the hybrid automatic repeat request status.

According to some implementations, determining the updated modulation and coding scheme can comprise determining a pass criteria of a hybrid automatic repeat request is more than a defined threshold and determining the updated modulation and coding scheme as the current modulation and coding scheme plus 1 (MCS+1). Additionally, determining the pass criteria of the hybrid automatic repeat request is more than the defined threshold can comprise receiving a hybrid automatic repeat request acknowledgement from the user equipment device. Further, the updated modulation and coding scheme can provide link adaptation.

Alternatively, or additionally, determining the updated modulation and coding scheme can comprise determining a pass criteria of a hybrid automatic repeat request is less than a defined threshold and determining the updated modulation and coding scheme as the current modulation and coding scheme minus 1 (MCS−1). According to an implementation, determining the pass criteria of the hybrid automatic repeat request is less than the defined threshold can comprise receiving a hybrid automatic repeat request negative acknowledgement from the user equipment device.

In some implementations, transmitting the first information via the multiple downlink control channels can comprise transmitting via a first downlink control channel of the multiple downlink control channels a number of multiple input, multiple output layers for a first physical downlink shared channel. Further to this implementation, transmitting via a second downlink control channel of the multiple downlink control channels a layer indication for a second physical downlink shared channel.

Another embodiment described herein is a method that can comprise scheduling, by a network device of a group of network devices, a first data traffic channel for a mobile device based on a traditional scheduling procedure. The method can also comprise scheduling, by the network device, a second data traffic channel for the mobile device based on an iterative scheduling procedure. Further, the method can comprise facilitating, by the network device, transmissions of two control channels, the first data traffic channel, and the second data traffic channel.

According to some implementations, scheduling the second data traffic channel can comprise determining a first modulation and coding scheme for the second data traffic channel as a lowest modulation and coding scheme selected from a data structure representing a group of modulation and coding schemes.

According to another implementation, the method can comprise obtaining a hybrid automatic repeat request status of a current downlink control channel based on an expiration of a defined time interval and determining an updated modulation and coding scheme based on the hybrid automatic repeat request status. Further to this implementation, the second data traffic channel can comprise a first modulation and coding scheme, and the method can comprise determining a pass criteria of a hybrid automatic repeat request is more than a defined threshold and determining the updated modulation and coding scheme as the first modulation and coding scheme plus 1 (MCS+1).

In accordance with some implementations, the second data traffic channel can comprise a first modulation and coding scheme, and the method can comprise determining a pass criteria of a hybrid automatic repeat request is less than a defined threshold and determining the updated modulation and coding scheme as the first modulation and coding scheme minus 1 (MCS−1).

A further embodiment relates to a machine-readable storage medium, comprising executable instructions that, when executed by a processor of a mobile device, facilitate performance of operations. The operations can comprise receiving, from a network device, information via multiple control channels and multiple data traffic channels. The operations can also comprise decoding the multiple data traffic channels. A first data traffic channel of the multiple data traffic channels can be scheduled based on a legacy scheduling procedure and at least a second data traffic channel of the multiple data traffic channels can be scheduled based on an iterative procedure.

According to some implementations, the operations can comprise using a single receiver for decoding the multiple data traffic channels. Alternatively, the operations can comprise using a first receiver for decoding the first data traffic channel and using a second receiver for decoding the second data traffic channel. In accordance with some implementations, the operations can comprise using an interference cancellation receiver for decoding the multiple data traffic channels.

Referring initially to FIG. 1, illustrated is an example, non-limiting, wireless communication system 100 in accordance with one or more embodiments described herein. In example embodiments, the wireless communication system 100 is or comprises a wireless communication network serviced by one or more wireless communication network providers. In example embodiments, the wireless communication system 100 can comprise one or more user equipment (UEs) 102 (e.g., $102_1$, $102_2$ . . . $102_n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. The UE 102 can also comprise Internet of Thing (IoT) devices that can communicate wirelessly. The UE 102 roughly corresponds to the mobile station (MS) in global system for mobile communications (GSM) systems. Thus, a network node 104 (e.g., network node device) can provide connectivity between the UE and the wider cellular network and can facilitate wireless communication between the UE and the wireless communication network (e.g., the one or more communication service provider networks 106) via the network node 104. The UE 102 can send and/or receive communication data wirelessly to the network node 104. The dashed arrow lines from the network node 104 to the UE 102 represent downlink (DL) communications and the solid arrow lines from the UE 102 to the network node 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In cellular radio access networks (e.g., universal mobile telecommunications system (UMTS) networks), a network node can be referred to as base transceiver stations (BTS), radio base station, radio network nodes, base stations, Node B, eNode B (e.g., evolved Node B), etc.). In 5G terminology, the node can be referred to as a gNode B (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can comprise but are not limited to: Node B devices, base station (BS) devices, access point (AP) devices, and radio access network (RAN) devices. The network node 104 can also comprise multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

The wireless communication system 100 can further comprise one or more communication service provider networks 106 that can facilitate providing wireless communication services to various UEs, comprising UE 102, via the network node 104 and/or various additional network devices (not shown) included in the one or more communication service provider networks 106. The one or more communication service provider networks 106 can comprise various types of disparate networks, comprising: cellular networks, femto networks, picocell networks, microcell networks, internet protocol (IP) networks Wi-Fi service networks, broadband service networks, enterprise networks, cloud based networks, and the like. For example, in at least one implementation, the wireless communication system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation).

In one example, the UE 102 can send a reference signal back to the network node 104. The network node 104 can take a received reference signal from the UE 102, estimate the condition of the channel, which can be influenced by various factors, such as objects in the line of sight, weather, movement, interference, etc., and after correcting for more issues (e.g., interference), can adjust the beamforming rates for each antenna transmitting to the UE 102, and can change parameters, so as to transmit a better beam toward the UE 102. This ability to select MIMO schemes and use beamforming to focus energy and adapt to changing channel conditions can allow for higher data rates.

Figure 2:
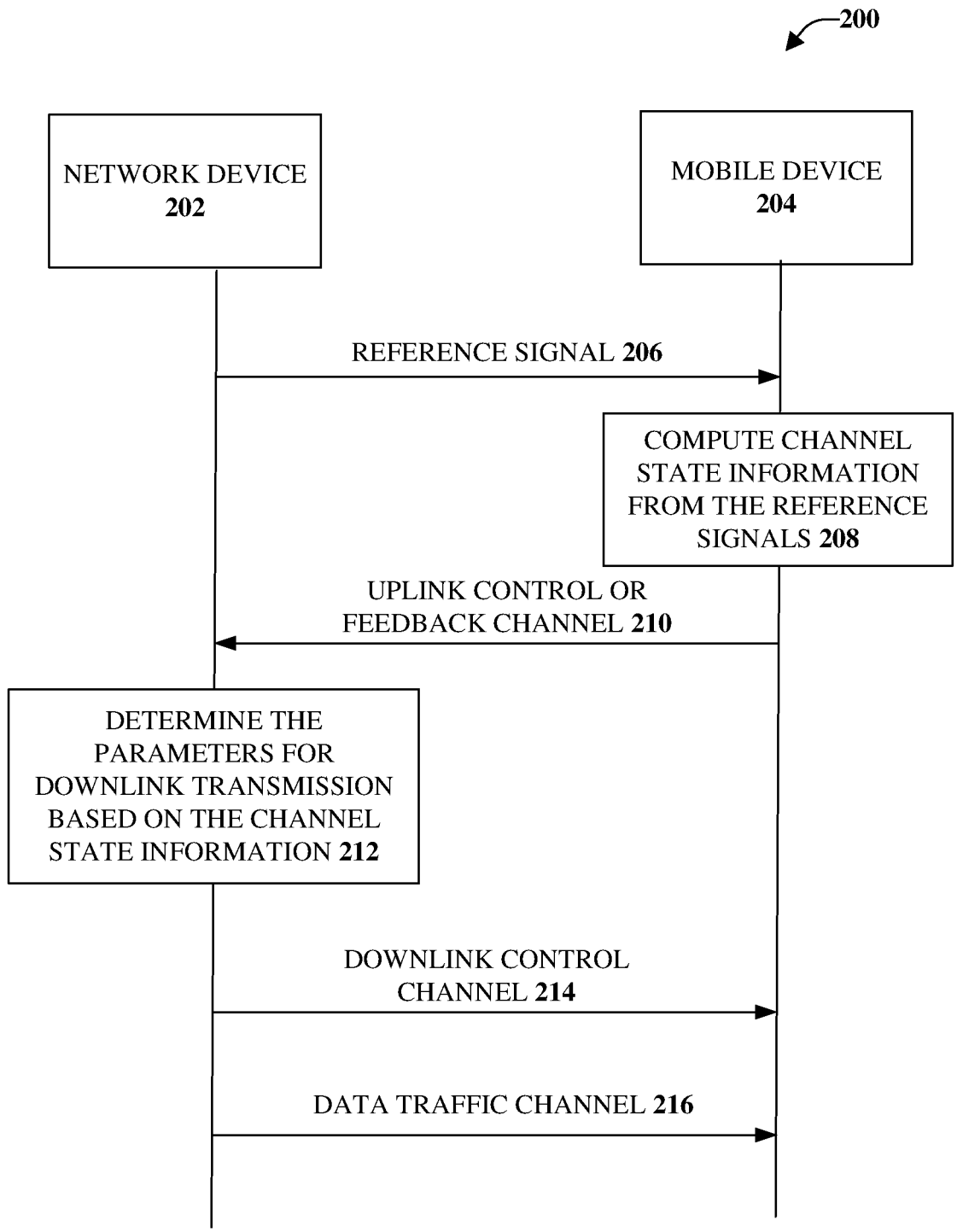
FIG. 2 illustrates an example, non-limiting, message sequence flow chart that can facilitate downlink data transfer in advanced networks in accordance with one or more embodiments described herein.

FIG. 2 illustrates an example, non-limiting, message sequence flow chart 200 that can facilitate downlink data transfer in advanced networks in accordance with one or more embodiments described herein. The message sequence flow chart 200 can be utilized for new radio, as discussed herein. As illustrated, the message sequence flow chart 200 represents the message sequence between a network device 202 (e.g., a gNB) and a mobile device 204. As used herein, the term "network device 202" can be interchangeable with (or can include) a network, a network controller or any number of other network components. One or more pilot signals and/or reference signals 206 can be transmitted from the network device 202 to the mobile device 204. The one or more pilot signals and/or reference signals 206 can be cell specific and/or user equipment specific signals. The one or more pilot signals and/or reference signals 206 can be beamformed or non-beamformed.

Based on the one or more pilot signals and/or reference signals 206, the mobile device 204 can compute the channel estimates and can compute the one or more parameters needed for Channel State Information (CSI) reporting, as indicated at 208. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 204 to the network device 202 via a feedback channel (e.g., an uplink control or feedback channel 210). The CSI report can be sent based on a request from the network device 202, a-periodically, and/or the mobile device 204 can be configured to report periodically or at another interval.

The network device 202, which can comprise a scheduler (e.g., a scheduler component), can use the CSI report for choosing the parameters for scheduling of the mobile device 204 (e.g., a particular mobile device). For example, as indicated at 212, the network device 202 can choose the parameters for downlink transmission based on the channel state information. The parameters for downlink transmission can include, but are not limited to: Modulation and Coding Scheme (MCS), power, Physical Resource Blocks (PRBs), and so on.

The network device 202 can send the scheduling parameters to the mobile device 204 via a downlink control channel (e.g., a downlink control channel 214). Upon or after the scheduling parameter information is transmitted, the actual data transfer can take place from the network device 202 to the mobile device 204 over a data traffic channel (e.g., data traffic channel 216).

Downlink reference signals are predefined signals occupying specific resource elements within the downlink time-frequency grid. There are several types of downlink reference signals that are transmitted in different ways and used for different purposes by the receiving terminal (e.g., the mobile device 204). For example, downlink reference signals can include CSI reference signals (CSI-RS) and/or demodulation reference signals (DM-RS).

CSI reference signals are specifically intended to be used by terminals (e.g., the mobile device 204) to acquire channel-state information (CSI) and beam specific information (beam RSRP). In 5G, for example, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator (LI), and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | | PMI-FormatIndicator = subbandPMI or CQI-FormatIndicator = subbandCQI | |
|---|---|---|---|
| | | CSI Part II | |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |

TABLE 1-continued

| PMI-FormatIndicator = widebandPMI and CQI-FormatIndicator = widebandCQI | | PMI-FormatIndicator = subbandPMI or CQI-FormatIndicator = subbandCQI | |
|---|---|---|---|
| | | CSI Part II | |
| | CSI Part I | wideband | Subband |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the Orthogonal Frequency-Division Multiplexing (OFDM) in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

Figure 3:
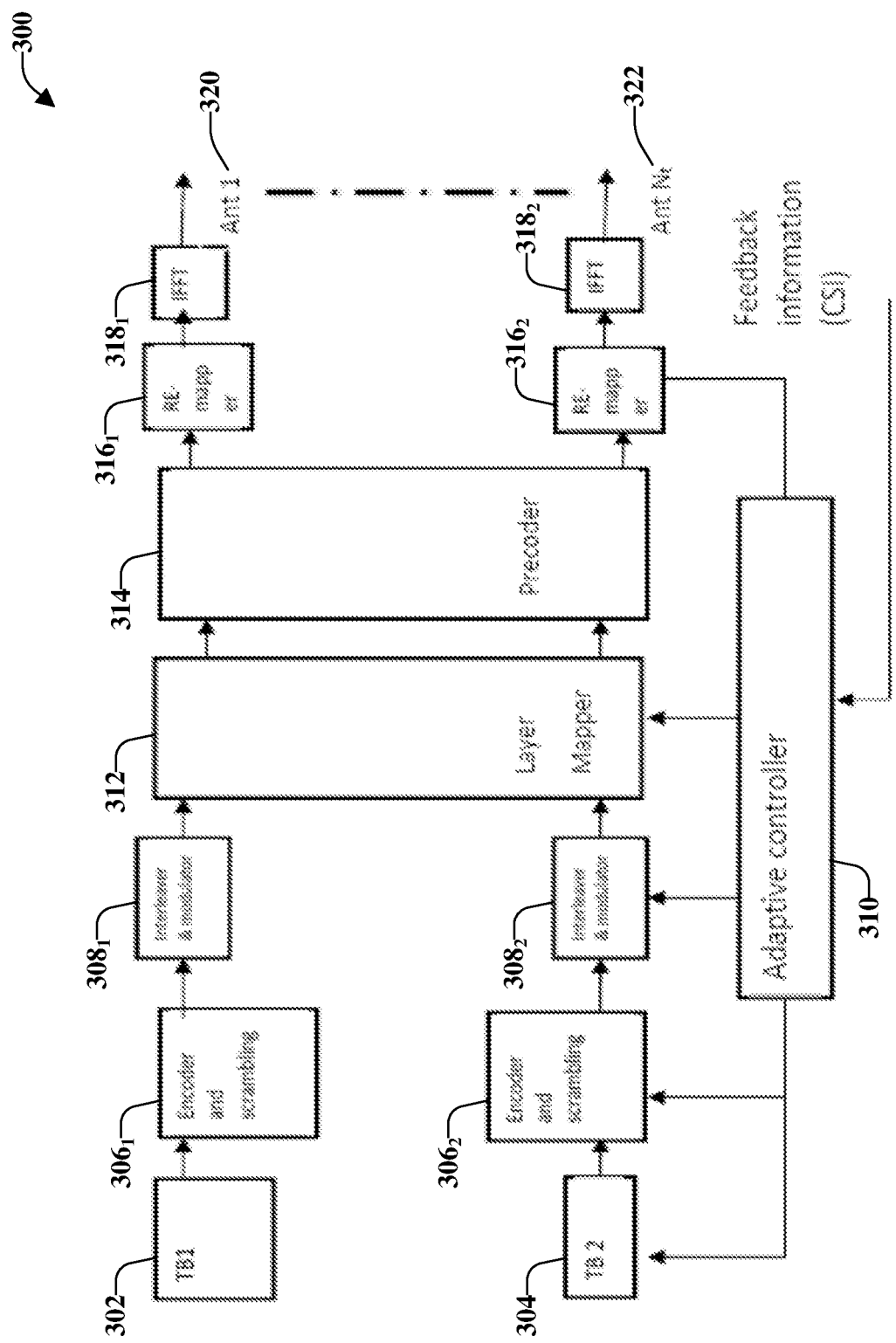
FIG. 3 illustrates an example, non-limiting, representation of a portion of a Multiple Input, Multiple Output communication system that comprises a coding chain for Physical Downlink Shared Channel transmitter in accordance with one or more embodiments described herein.

FIG. 3 illustrates an example, non-limiting, representation of a portion of a MIMO communication system 300 that comprises a coding chain for PDSCH transmitter in accordance with one or more embodiments described herein. More specifically, illustrated is a transmission side of a MIMO communication system with $N_t$ transmit antennas. There are up to two transport blocks (TBs), illustrated as a first transport block 302 (TB1) and a second transport block 304 (TB2). The number of transport blocks is equal to one when the number of layers is less than or equal to four. If the number of layers is more than four, then two transport blocks are transmitted.

The CRC bits are added to each transport block (e.g., the first transport block 302 and the second transport block 304) and passed to the channel encoder (e.g., encoder and scrambling $306_1$ and $306_2$). Low density parity check codes (LDPC) is the FEC for NR. The channel encoder (e.g., encoder and scrambling $306_1$ and $306_2$) adds parity bits to protect the data. After encoding, the data stream is scrambled with user specific scrambling. Then the stream is passed through an interleaver (e.g., interleaver and modulator $308_1$ and $308_2$). The interleaver size is adaptively controlled by puncturing to increase the data rate. The adaptation is achieved by using the information from the feedback channel, for example channel state information sent by the receiver. The interleaved data is passed through a symbol mapper (modulator). The symbol mapper is also controlled by the adaptive controller 310. After modulation, the streams are passed through a layer mapper 312 and a precoder 314. The resultant symbols are mapped (e.g., via a re-mapper $316_1$ and $316_2$) to the resource elements in the time-frequency grid of OFDM. The resultant streams are then passed through an IFFT block (e.g., IFFT $318_1$ and $318_2$). It is noted that IFFT block (e.g., IFFT $318_1$ and $318_2$) is necessary for some communication systems which implement OFDMA as the access technology (e.g., 5G, LTE/LTE-A, and so on), in other systems it might be different and is dependent on the multiple access system. The encoded stream is then transmitted through the respective antenna (e.g., a first antenna 320 (Ant 1) through an Nth antenna 322 (Ant $N_t$).

As mentioned, the UE reports CQI, RI, PMI, and LI as part of CSI reporting. Since NR uses a single codeword for reported ranks less than or equal to 4, the CQI is generally computed either the minimum of the Signal to Interference plus Noise Ratio (SINR) of all the layers or average of all the layers. Upon or after the network (e.g., the network node) receives this information, the network can schedule MCS based on the reported CQI value, hence it does not know even though some of the layers have the high SINR compared to report CQI (SINR). This in turn reduces the potential improvement in the performance of NR MIMO system. Therefore, the disclosed aspects provide an efficient solution to improve the NR MIMO performance.

According to the various aspects discussed herein, the UE can be scheduled with multiple PDSCHs. For example, one PDSCH can use conventional MCS obtained from reported CQI, while another PDSCH can use only one layer transmission with the lowest MCS. Since the UE reports the best layer indicator as of CSI, the network can use the same layer and transmit an additional PDSCH on this layer. Further, as discussed herein, the network can use multiple downlink control channels to indicate the number of layers for the first PDSCH and the layer indication for the second PDSCH.

By using multiple downlink control channels to indicate the MCS and layers, the network can use resources more efficiently. The various aspects discussed herein include multiple embodiments that can be implemented both at the network node and at the UE. For example, provided is a method, facilitated by the network node device, to transmit two downlink control channels and two data traffic channels. Also provided is a method, facilitated by the UE, to decode multiple downlink control channels to decode the data channels. Other embodiments are also provided herein, as discussed below.

The one or more aspects can provide one or more advantages. For example, significant gains in sector throughput and cell edge user throughput can be achieved. Further, one or more legacy feedback channels can be used, which can reduce the standardization effort for designing a new control channel for indicating the layer information. In addition, with compact uplink control channel, significant gains can be realized.

It is noted that the various aspects are described for downlink data transmission for MIMO systems. However, the same or similar principles can be applicable for uplink and side link systems.

Further, the term network device (e.g., network node, network node device, radio network node, and so on) is used herein to refer to any type of network node serving communication devices and/or connected to other network nodes, network elements, or another network node, or any radio node from where the communication device can receive a signal. In cellular radio access networks (e.g., universal mobile telecommunications system (UMTS) networks), network nodes can be referred to as Base Transceiver Stations (BTS), radio base station, radio network nodes, Base Stations (BSs), NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, Base Station (BS) devices, Access Point (AP) devices, and Radio Access Network (RAN) devices. The network nodes can also include multi-standard radio (MSR) radio node devices (e.g., MSR BS), comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

In some embodiments the non-limiting term user equipment (UE) is used and refers to any type of wireless device communicating with a radio network node in a cellular or mobile communication system. Examples of a UE are: target device, device to device (D2D) UE, machine type UE or UE capable of machine to machine (M2M) communication, PDA, iPad, tablet, mobile terminals, smart phone, Laptop Embedded Equipped (LEE), Laptop Mounted Equipment (LME), USB dongles, and so forth.

It is also noted that that the terms element, elements, and/or antenna ports can be used interchangeably but carry the same meaning in this disclosure.

A principle behind the disclosed aspects is that rather than using single scheduling grant/downlink control channel for scheduling, the network uses multiple scheduling grants/downlink control channels where the first downlink control indicated scheduling of one or more layers using the conventional MCS and the additional downlink control channel indicates the one layer and a lowest or lower MCS in the MCS table. Therefore, the conventional NR MIMO single codeword system can be improved by using an additional downlink control channel and additional PDSCH. Note that for the additional PDSCH, the layer information (LI) is obtained from the LI obtained from the CSI report.

Figure 4:
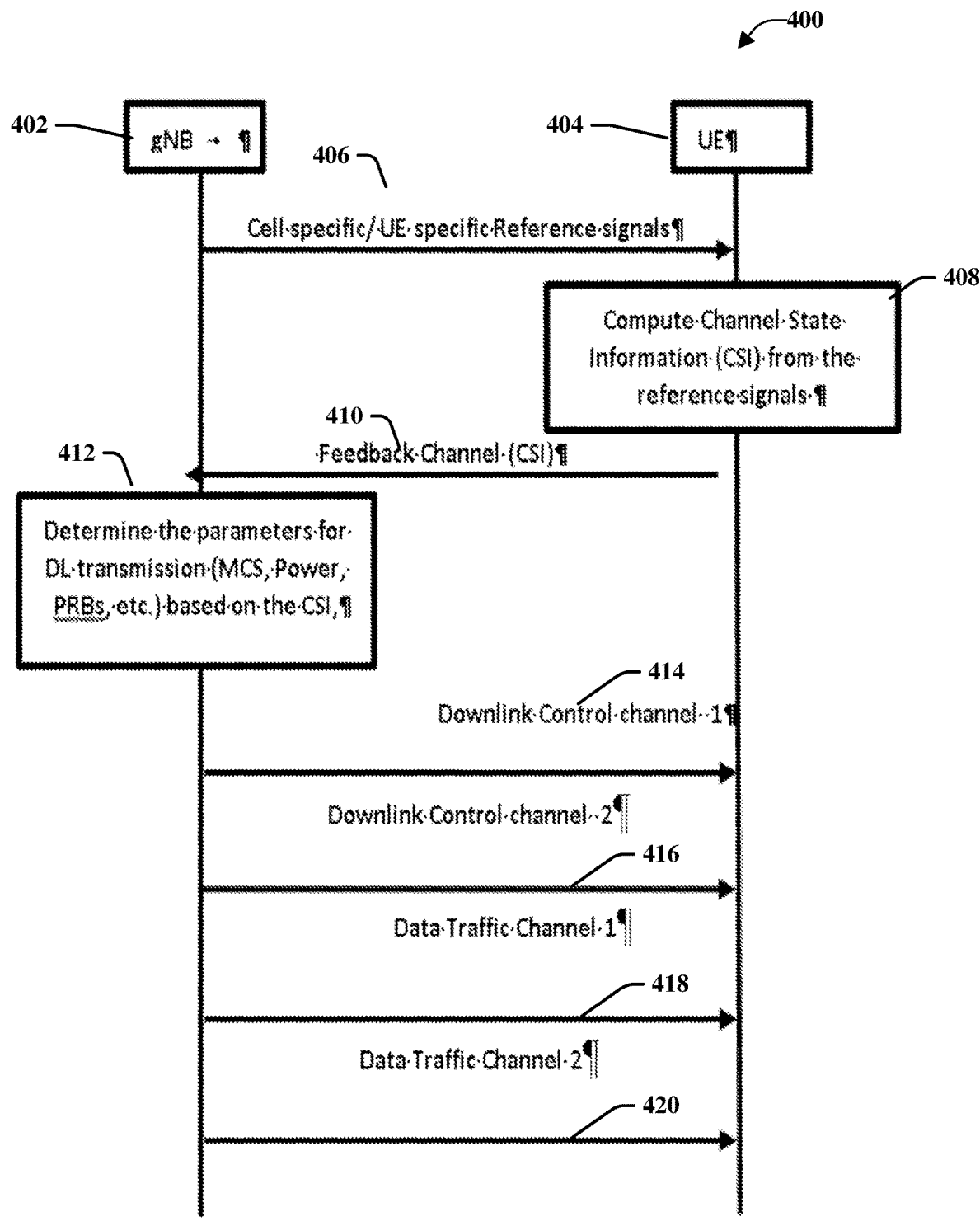
FIG. 4 illustrates an example, non-limiting message sequence chart for multiple scheduling grants in accordance with one or more embodiments described herein.

Turning now to FIG. 4, illustrated is an example, non-limiting message sequence chart 400 for multiple scheduling grants in accordance with one or more embodiments described herein. In an embodiment, a gNB 402 can send a cell specific/UE specific reference signal 406 to a UE 404. The UE 404 can compute the channel state information (CSI) from the reference signals at 408 and send it back to the gNB 402 via a feedback channel 410.

At 412, the gNB 402 can determine the parameters for DL transmissions (including, but not limited to, modulation and coding schemes, power, physical resource blocks, etc.) based on the CSI. The gNB 402 can then send, to the UE 404, a first set of downlink control information via a first downlink control channel 414. Simultaneously or sequentially, the gNB can transmit, to the UE 404, a second group of downlink control information via a second downlink control channel 416. The two groups of downlink control information can respectively configure and establish data traffic channel 1 418 and data traffic channel 2 420. It is to be appreciated that in other embodiments, gNB 402 can establish more than two data traffic channels, each with respective downlink control channels to configure the multiple data traffic channels. Accordingly, although two scheduling grants and two data traffic channels are illustrated and described, the various aspects discussed herein can be extended to more than two scheduling grants and more than two data traffic channels.

Figure 5:
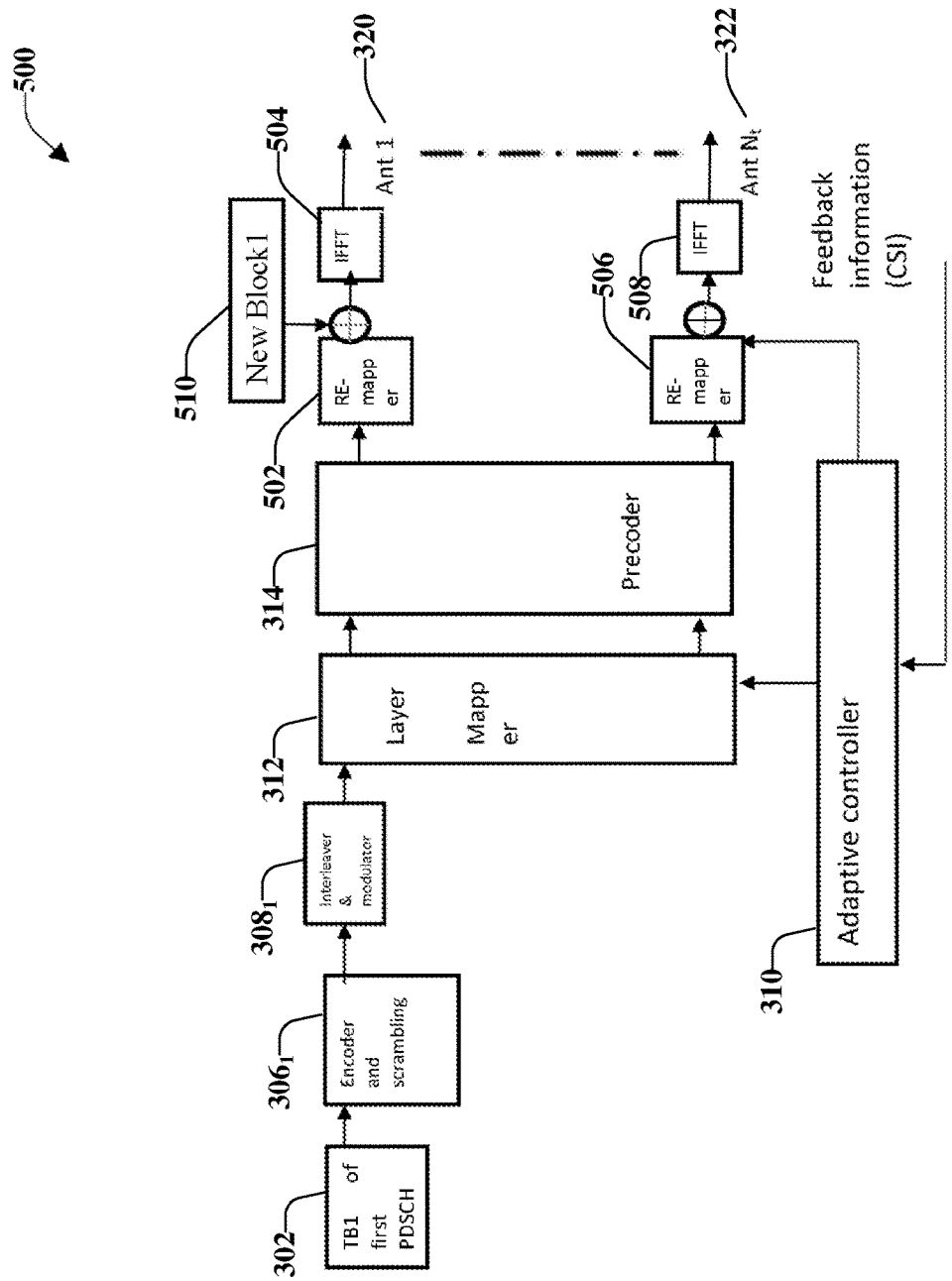
FIG. 5 illustrates an example, non-limiting, coding chain for a multiple Physical Downlink Shared Channel scheme in accordance with one or more embodiments described herein.

FIG. 5 illustrates an example, non-limiting, coding chain 500 for a multiple PDSCH scheme in accordance with one or more embodiments described herein. Repetitive description of like elements employed in other embodiments described herein is omitted for sake of brevity.

The coding chain 500 for a first transport block for the first data channel can include blocks for encoding and scrambling, interleaver and modulator blocks, layer mapper blocks, precoder blocks, and adaptive controller blocks.

A remapper 502 can also be included in the coding chain After the remapper 502 performs the functions of the remapper 502, the output of the remapper 502 and coding chain for a second data traffic channel can be combined, and an Inverse Fast Fourier Transform (IFFT) block 504 can transform the combination for transmission to Antenna 1.

Similarly, for Antenna N, coding chain for a second transport block for the first data channel can include blocks for encoding and scrambling, interleaver and modulator blocks, layer mapper blocks, precoder blocks, and adaptive controller blocks. After the remapper 506 performs the functions of the remapper 506, the output of the remapper 506 and coding chain for a second data traffic channel can be combined, and an IFFT block 508 can transform the combination for transmission to Antenna N.

The transmission of conventional PDSCH is same (e.g., it uses the number of layers as indicated by the UE), however there is a second block added after the remappers 502 and 506, where a second PDSCH coding chain with a same or different number of layers compared to the first PDSCH is transmitted with a modulating and coding scheme (MCS) less than the conventional MCS. Note that the HARQ process number field in the PDCCH field of the second PDSCH and second PDCCH can be the same or different. In one embodiment the HARQ process number of each PDSCH is same, in another embodiment it can be different.

Upon or after the UE receives multiple downlink control channels and multiple data traffic channels, the UE can decode the data traffic channels individually to decode each transport blocks to determine whether each transport block is pass or not. In one embodiment, the UE uses conventional receiver for each PDSCH. However, the performance is improved if the UE removes the interference for one PDSCH as it can reconstruct the transmitted signal as it knows the scheduling parameters for the PDSCH.

Figure 6:
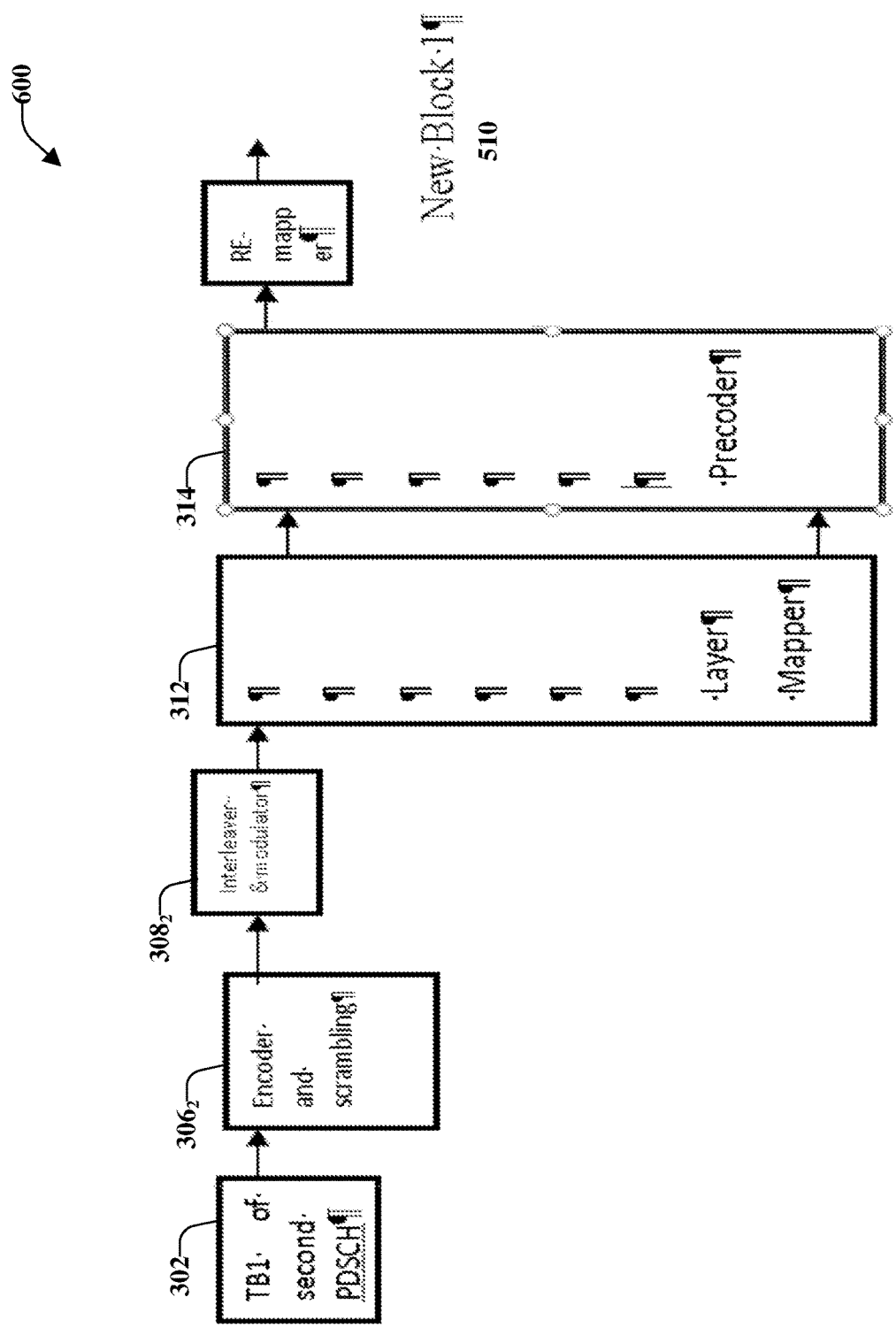
FIG. 6 illustrates an example, non-limiting, coding chain for the second Physical Downlink Shared Channel in accordance with one or more embodiments provided herein.

The coding chain 500 comprises two PDSCHs. The first PDSCH uses the same structure as that of a conventional PDSCH. However, at the output of resource element mapper (e.g., the remapper 502) a second output from the other PDSCH is added (FIG. 6). The resultant signal is passed through Inverse Fast Fourier Transform (IFFT) block 504 as that of the conventional coding chain. As shown in FIG. 5, the transmission of conventional PDSCH is the same (e.g., it uses the number of layers as indicated by the UE (or it can change)). However, there is a second block (e.g., new block 510) added after the remapper 502, where a single layer is transmitted with an MCS less than the conventional MCS on the layer indicated by the UE in the LI report.

FIG. 6 illustrates an example, non-limiting, coding chain 600 for the second PDSCH in accordance with one or more embodiments provided herein. For example, the coding chain 600 can be included as the new block 510 of FIG. 5. Repetitive description of like elements employed in other embodiments described herein is omitted for sake of brevity.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
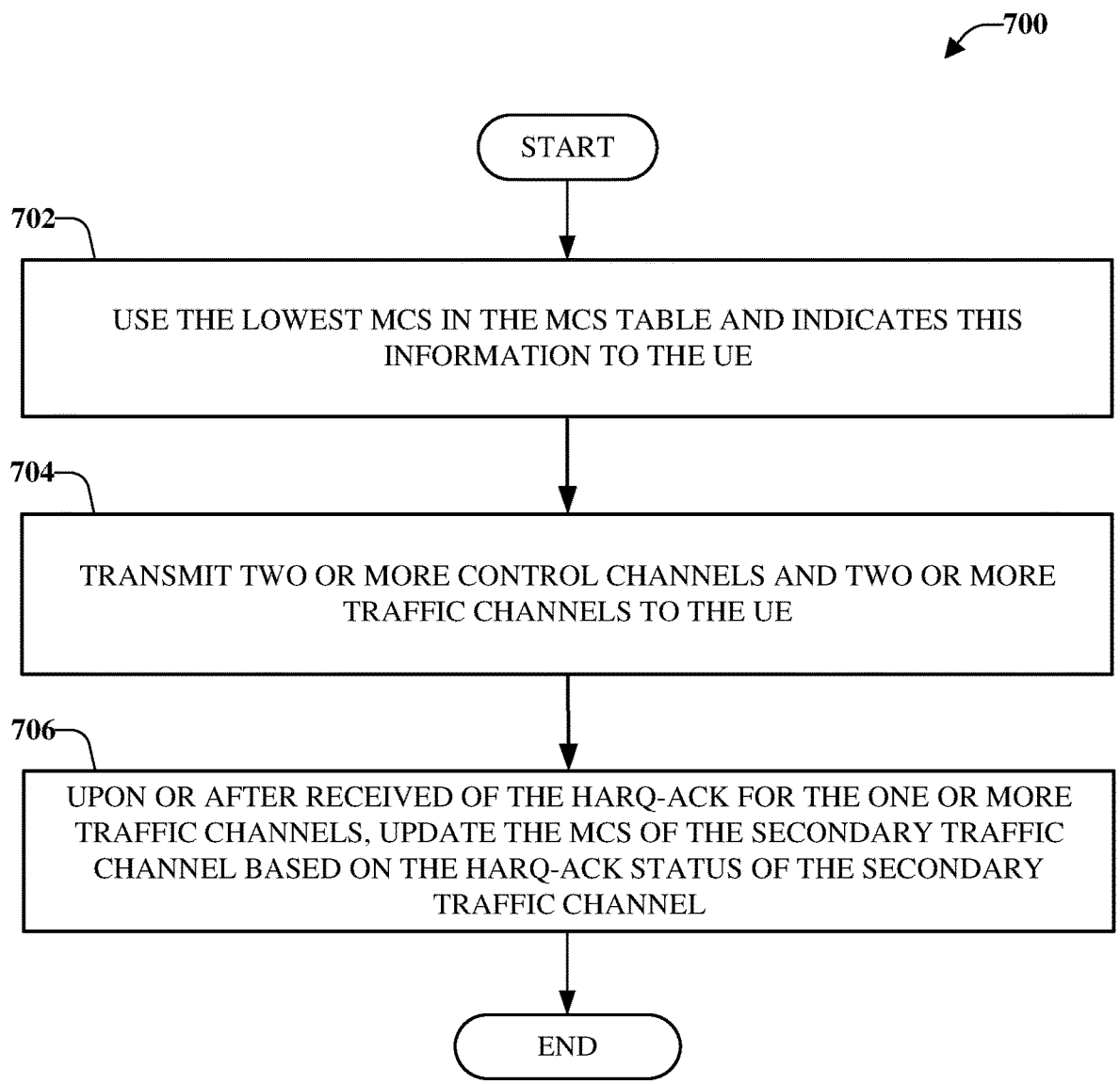
FIG. 7 illustrates a flowchart of an example, non-limiting, computer-implemented method for determination of Modulation and Coding Scheme for the second Physical Downlink Shared Channel in accordance with one or more embodiments described herein.

The computation of MCS for the primary traffic channel can be performed as per the conventional techniques. However, the computation of MCS for the secondary traffic channel needs further processing as the UE reports only CQI which corresponds to the primary traffic channel. FIG. 7 illustrates a flowchart of an example, non-limiting, computer-implemented method 700 for determination of MCS for the second PSCCH in accordance with one or more embodiments described herein.

Although FIG. 7 is illustrated and described with respect to a specific implementation (e.g., a device), the disclosed aspects are not limited to this implementation. In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein.

At 702 of the computer-implemented method, the network device can use the lowest MCS in the MCS table and indicates this information to the UE. For example, to indicate the information to the UE, the network device can use a secondary downlink control channel. Further, at 704 of the computer-implemented method 700, the network device can transmit two or more control channels and two or more traffic channels to the UE.

The UE can send HARQ-ACK for both the traffic channels. Therefore, upon or after receipt of the HARQ-ACK for the one or more traffic channels, at 706 of the computer-implemented method, the network node can update the MCS of the secondary traffic channel based on the HARQ-ACK status of the secondary traffic channel. For example, if the network device receives NACK, then the network device can use the lowest or MCS or $MCS_{updated}=MCS_{previous}-1$. As discussed herein the previous MCS ($MCS_{previous}$) can be referred to as a current MCS, a first MCS, or the like. However, if the network device receives HARQ-ACK for the secondary traffic channel, then the network device can update the $MCS_{updated}=MCS_{previous}+1$, thereby providing the link adaptation on the secondary traffic channel.

Upon or after the UE receives multiple downlink control channels and multiple data traffic channels, the UE can decode the data traffic channels individually to decode each transport blocks to determine whether each transport block is pass or not. In one embodiment, the UE uses a conventional receiver for each PDSCH. However, the performance is improved if the UE removes the interference for one PDSCH as the UE can reconstruct the transmitted signal as it knows the scheduling parameters for the PDSCH.

According to an implementation, the UE can decode two data traffic channels by using individual receivers. According to another implementation, the UE can decode two data traffic channels using a joint receiver. According to yet another implementation, the UE can decode the two traffic channels using an interference cancellation receiver.

Figure 8:
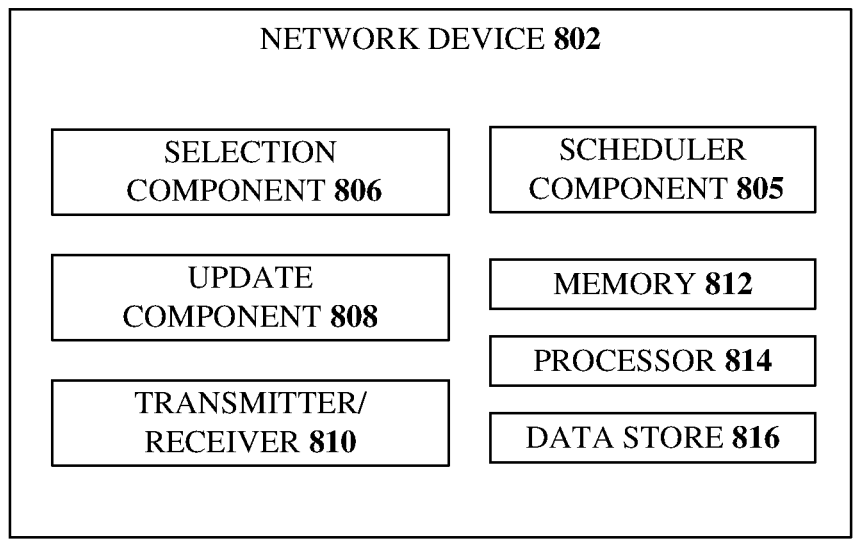
FIG. 8 illustrates an example, non-limiting, system for facilitating improved performance of Multiple Input, Multiple Output with multiple downlink control channels in advanced networks in accordance with one or more embodiments described herein.
Figure 8:
Figure 8:
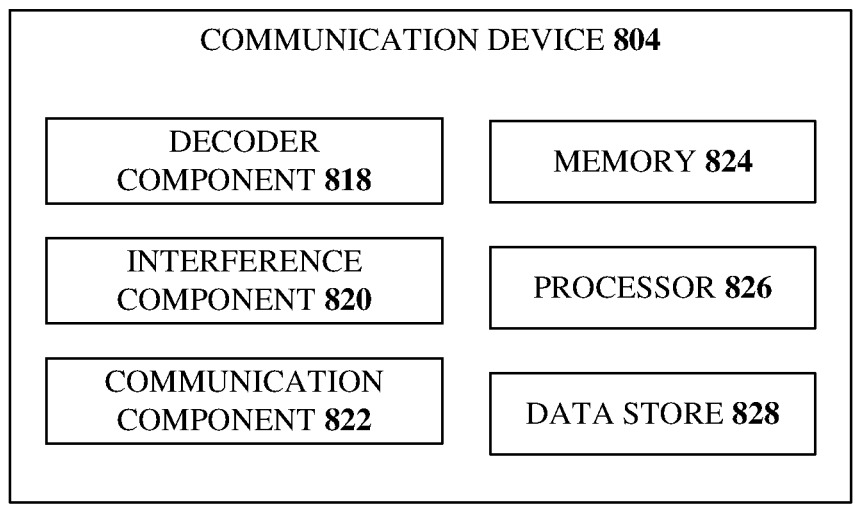

FIG. 8 illustrates an example, non-limiting, system 800 for facilitating improved performance of MIMO with multiple downlink control channels in advanced networks in accordance with one or more embodiments described herein. As illustrated in FIG. 8, the system 800 can include a network device 802 and a communication device 804 (e.g., a user equipment device, a mobile device, and so on). The network device 802 can be included in a group of network devices of a wireless network. Although only a single network device and a single communication device are shown and described, the various aspects are not limited to this implementation. Instead, multiple communication devices and/or multiple network devices can be included in a communications system.

The network device 802 can include a scheduler component 805, a selection component 806, an update component 808, a transmitter/receiver component 810, at least one memory 812, at least one processor 814, and at least one data store 816. The communication device 804 can include a decoder component 818, an interference component 820, a communication component 822, at least one memory 824, at least one processor 826, and at least one data store 828.

It is noted that the disclosed aspects are discussed with respect to MCS for a second PDSCH, however, the disclosed aspects can be utilized for additional PDSCHs (e.g., more than two PDSCHs). The scheduler component 805 can be configured to schedule multiple data traffic channels for a user equipment device. For example, the scheduler component 805 can schedule a first data traffic channel of the multiple data traffic channels based on a legacy scheduling procedure. In addition, the scheduler component 805 can schedule a second data traffic channel of the multiple data traffic channels based on an iterative procedure.

The transmitter/receiver component 810 can transmit, to the communication device 804, first information via multiple downlink control channels. According to some implementations, the multiple downlink control channels can comprise two or more downlink control channels. The transmitter/receiver component 810 also can transmit, to the communication device 804, second information via the multiple data traffic channels (e.g., the first data traffic channel, the second data traffic channel). According to some implementations, the multiple data traffic channels can comprise more than two data traffic channels.

According to some implementations, the iterative procedure can comprise selecting by the selection component 806 a lowest modulation and coding scheme from a group of modulation and coding schemes of a modulation and coding scheme set. Further, the scheduler component 805 can use the lowest modulation and coding scheme as a current modulation and coding scheme (e.g., $MCS_{previous}$).

The update component 808 (or a timer component (not shown)) can be configured to determine expiration of a defined time interval. Based on the expiration, the transmitter/receiver component 810 (or another system component) can obtain a hybrid automatic repeat request status of a first downlink control channel of the multiple downlink control channels. For example, the communication device 804 can transmit an HARQ-ACK or NACK as the hybrid automatic repeat request status. Based on the hybrid automatic repeat request status, the selection component 806 can be configured to determine an updated modulation and coding scheme.

Further, according to some implementations, the update component 808 (or another system component) can determine a pass criteria of a hybrid automatic repeat request is more than a defined threshold. According to some implementations, the update component 808 (or the other system component) can determine the pass criteria of the hybrid automatic repeat request is more than the defined threshold based on receipt (e.g., via the transmitter/receiver component 810) of a hybrid automatic repeat request acknowledgement from the user equipment device.

In addition, the update component 808 can determine the updated modulation and coding scheme as the current modulation and coding scheme plus 1 (MCS+1). The updated modulation and coding scheme can provide link adaptation.

According to some implementations, the update component 808 (or another system component) can determine a pass criteria of a hybrid automatic repeat request is less than a defined threshold. For example, the update component 808 can determine the pass criteria of the hybrid automatic repeat request is less than the defined threshold based on receipt (e.g., via the transmitter/receiver component 810) of a hybrid automatic repeat request negative acknowledgement from the user equipment device. Further, the update component 808 can determine the updated modulation and coding scheme as the current modulation and coding scheme minus 1 (MCS−1).

For example, if the network device 802 receives NACK, then the network device 802 uses the lowest or MCS or $MCS_{updated}=MCS_{previous}-1$. However, if the network device 802 receives HARQ-ACK for the secondary traffic channel, then the network device 802 updates the $MCS_{updated} = MCS_{previous} + 1$, thereby providing the link adaptation on the secondary traffic channel.

In an example, the transmitter/receiver component 810 can transmit, via a first downlink control channel of the multiple downlink control channels, a number of multiple input, multiple output layers for a first physical downlink shared channel. The transmitter/receiver component 810 also can transmit, via a second downlink control channel of the multiple downlink control channels, a layer indication for a second physical downlink shared channel.

According to some implementations, the multiple downlink control channels can comprise downlink control channels configured to operate according to a fifth generation wireless network communication protocol. Further, the multiple data traffic channels can comprise data traffic channels configured to operate according to a fifth generation wireless network communication protocol.

The UE can, via the decoder component 818, decode the traffic channels. For example, the communication component 822 can receive the information in the multiple traffic channels and the decoder component 818 can perform the decoding. According to some implementations, individual receivers can be utilized to decode the traffic channels. For example, a first receiver can be utilized to decode a first traffic channel, a second receiver can be utilized to decode a second traffic channel, a third receiver can be utilized to decode a third traffic channel, and so on.

According to other implementations, a joint receiver can be utilized to decode the traffic channels. Thus, a single receiver can be utilized to decode the two or more traffic channels.

In another implementation, the interference component 820 can be utilized to decode the two traffic channels. Thus, the interference component 820 can be an interference cancellation receiver. By removing the interference for one PDSCH, the transmitted signal can be reconstructed based on knowledge of the scheduling parameters for the PDSCH.

The transmitter/receiver component 810 (and/or the communication component 822) can be configured to transmit to (and/or receive data from) the communication device 804 (or the network device 802), other network devices, and/or other communication devices. Through the transmitter/receiver component 810 (and/or the communication component 822), the network device 802 (and/or the communication device 804) can concurrently transmit and receive data, can transmit and receive data at different times, or combinations thereof. According to some implementations, the communication component 822 can be configured to receive, from the network device 802 or other network devices, multimedia content.

The at least one memory 812 can be operatively connected to the at least one processor 814. Further, the at least one memory 824 can be operatively connected to the at least one processor 826. The memories (e.g., the at least one memory 812, the at least one memory 824) can store executable instructions that, when executed by the processors (e.g., the at least one processor 814, the at least one processor 826) can facilitate performance of operations. Further, the processors can be utilized to execute computer executable components stored in the memories.

For example, the memories can store protocols associated with improving the performance of MIMO systems with multiple downlink control channels as discussed herein. Further, the memories can facilitate action to control communication between the communication device 804 and the network device 802 such that the system 800 can employ stored protocols and/or algorithms to achieve improved communications in a wireless network as described herein.

The memories can store respective protocols associated with improving the performance of MIMO systems with multiple downlink control channels in advanced networks, taking action to control communication between the communication device 804 and the network device 802, such that the system 800 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to selection and/or assignment of demodulation reference signal port combinations in a communication network. The processors can be processors dedicated to analyzing and/or generating information received, a processor that controls one or more components of the system 800, and/or a processor that both analyzes and generates information received and controls one or more components of the system 800.

Figure 9:
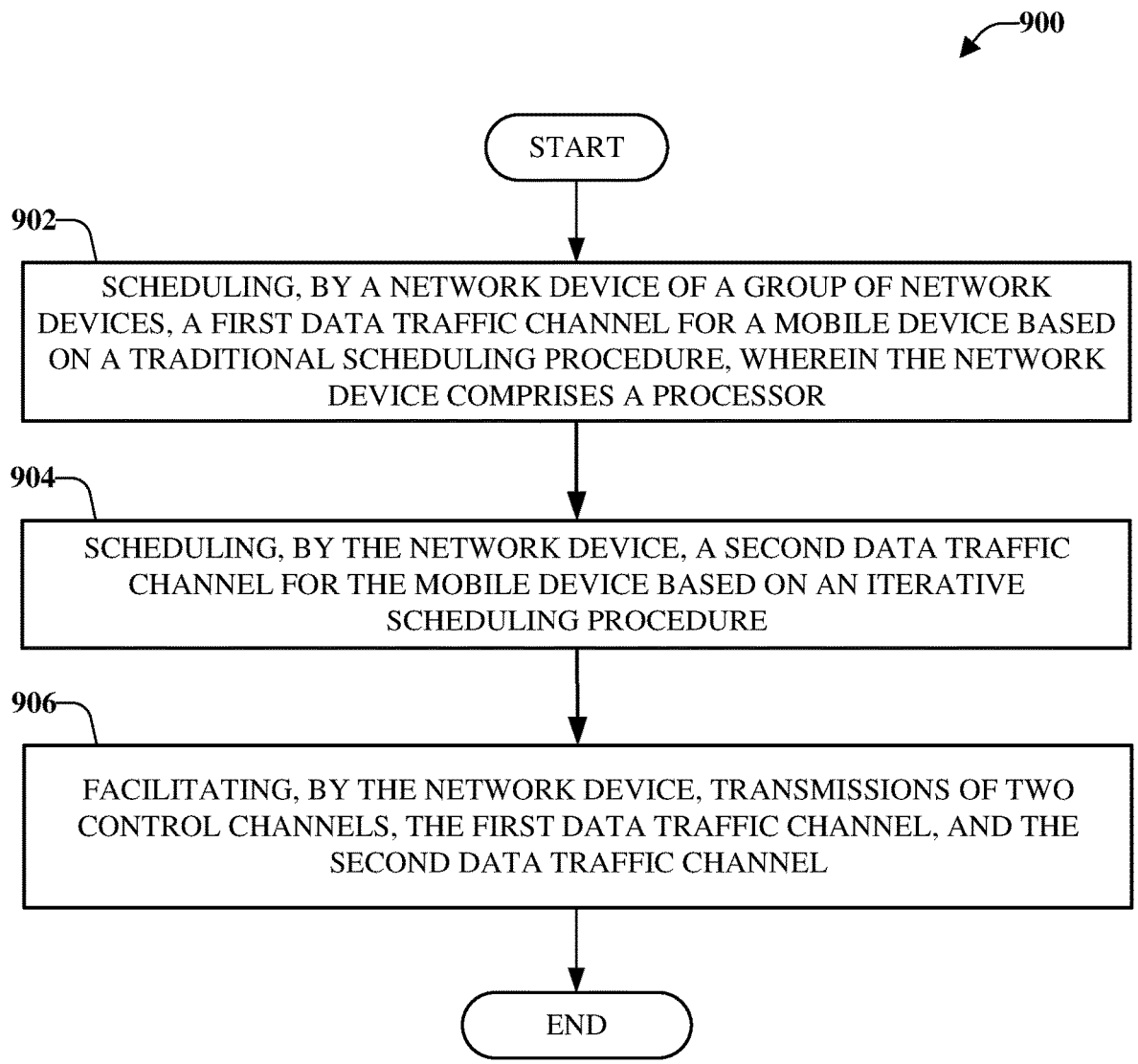
FIG. 9 illustrates a flowchart of an example, non-limiting, computer-implemented method for providing multiple downlink control channels for improved performance in a Multiple Input, Multiple Output wireless network in accordance with one or more embodiments described herein.

FIG. 9 illustrates a flowchart of an example, non-limiting, computer-implemented method 900 for providing multiple downlink control channels for improved performance in a MIMO wireless network in accordance with one or more embodiments described herein. Repetitive description of like elements employed in other embodiments described herein is omitted for sake of brevity.

Although FIG. 9 is illustrated and described with respect to a specific implementation (e.g., a network device), the disclosed aspects are not limited to this implementation. In some implementations, a system comprising a processor can perform the computer-implemented method 900 and/or other methods discussed herein. In other implementations, a device comprising a processor can perform the computer-implemented method 900 and/or other methods discussed herein. In other implementations, a machine-readable storage medium, can comprise executable instructions that, when executed by a processor, facilitate performance of operations, which can be the operations discussed with respect to the computer-implemented method 900 and/or other methods discussed herein.

At 902 of the computer-implemented method 900, the network device can schedule a first data traffic channel for a mobile device based on a traditional scheduling procedure. Further, at 904 of the computer-implemented method 900, the network device can schedule a second data traffic channel for the mobile device based on an iterative scheduling procedure.

For example, scheduling the second data traffic channel can comprise determining a first modulation and coding scheme for the second data traffic channel as a lowest modulation and coding scheme selected from a data structure representing a group of modulation and coding schemes.

Transmission of two control channels, the first data traffic channel, and the second data traffic channel can be facilitated by the network device at 906 of the computer-implemented method 900.

According to some implementations, the computer-implemented method 900 can comprise obtaining a hybrid automatic repeat request status of a current downlink control channel based on an expiration of a defined time interval. Further to these implementations, the computer-implemented method 900 can comprise determining an updated modulation and coding scheme based on the hybrid automatic repeat request status.

For example, the second data traffic channel can comprise a first modulation and coding scheme. Further to this example, the computer-implemented method 900 can comprise determining a pass criteria of a hybrid automatic repeat request is more than a defined threshold and determining the updated modulation and coding scheme as the first modulation and coding scheme plus 1 (MCS+1).

According to another example, the computer-implemented method 900 can comprise determining a pass criteria of a hybrid automatic repeat request is less than a defined threshold. Further to this example, the computer-implemented method 900 also can comprise determining the updated modulation and coding scheme as the first modulation and coding scheme minus 1 (MCS−1).

Figure 10:
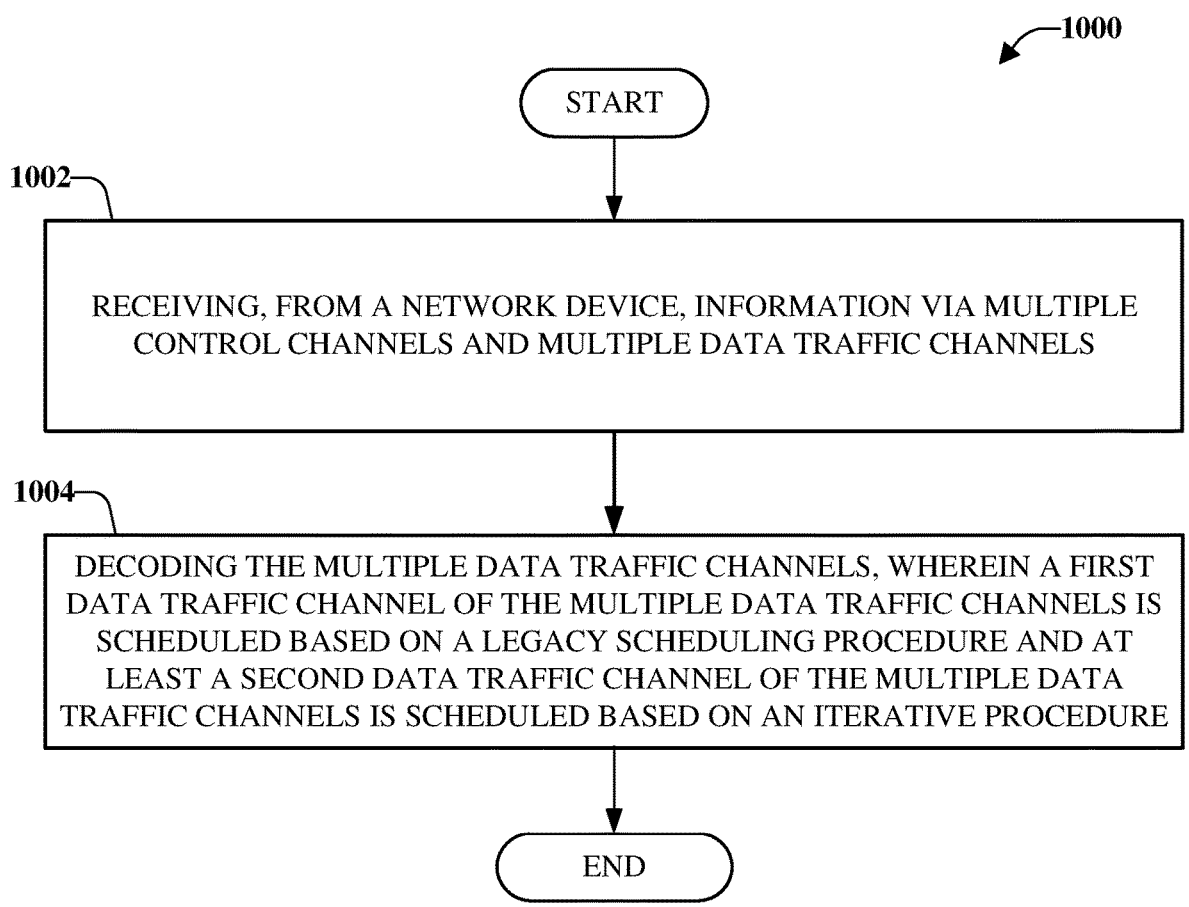
FIG. 10 illustrates a flowchart of an example, non-limiting, computer-implemented method for decoding multiple data traffic channels for improved performance in a Multiple Input, Multiple Output wireless network in accordance with one or more embodiments described herein.

FIG. 10 illustrates a flowchart of an example, non-limiting, computer-implemented method 1000 for decoding multiple data traffic channels for improved performance in a MIMO wireless network in accordance with one or more embodiments described herein. Repetitive description of like elements employed in other embodiments described herein is omitted for sake of brevity.

Although FIG. 10 is illustrated and described with respect to a specific implementation (e.g., a user equipment device), the disclosed aspects are not limited to this implementation. In some implementations, a system comprising a processor can perform the computer-implemented method 1000 and/or other methods discussed herein. In other implementations, a device comprising a processor can perform the computer-implemented method 1000 and/or other methods discussed herein. In other implementations, a machine-readable storage medium, can comprise executable instructions that, when executed by a processor, facilitate performance of operations, which can be the operations discussed with respect to the computer-implemented method 1000 and/or other methods discussed herein.

At 1002 of the computer-implemented method 1000, a mobile device comprising a processor can receive, from a network device, information via multiple control channels and multiple data traffic channels (e.g., via the communication component 822).

The multiple data traffic channels can be decoded at 1004 of the computer-implemented method (e.g., via the decoder component 818). A first data traffic channel of the multiple data traffic channels is scheduled based on a legacy scheduling procedure and at least a second data traffic channel of the multiple data traffic channels is scheduled based on an iterative procedure.

In accordance with another implementation, a first receiver can be used for decoding the first data traffic channel. Further to this implementation, a second receiver can be used for decoding the second data traffic channel Subsequent receivers can be used for decoding subsequent information in subsequent traffic channels (e.g., a third data traffic channel, a fourth data traffic channel, a fifth data traffic channel, and so on).

According to an alternative implementation, a joint receiver (e.g., a single receiver) can be used for decoding the multiple data traffic channels, at 1004, and for decoding the fourth information in the second traffic channel, at 1006. The joint receiver can also be used to decode subsequent traffic channels (e.g., a third data traffic channel, a fourth data traffic channel, a fifth data traffic channel, and so on).

In an additional, or alternative, implementation, an interference cancellation receiver can be used for decoding the multiple data traffic channels. For example, removing interference for one PDSCH can improve performance since the mobile device can reconstruct the transmitted signal since the scheduling parameters for the PDSCH are known.

Described herein are systems, methods, articles of manufacture, and other embodiments or implementations that can facilitate improving the performance of MIMO systems with multiple downlink control channels in advanced networks. Facilitating improving the performance of MIMO systems with multiple downlink control channels for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations.

The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

Figure 11:
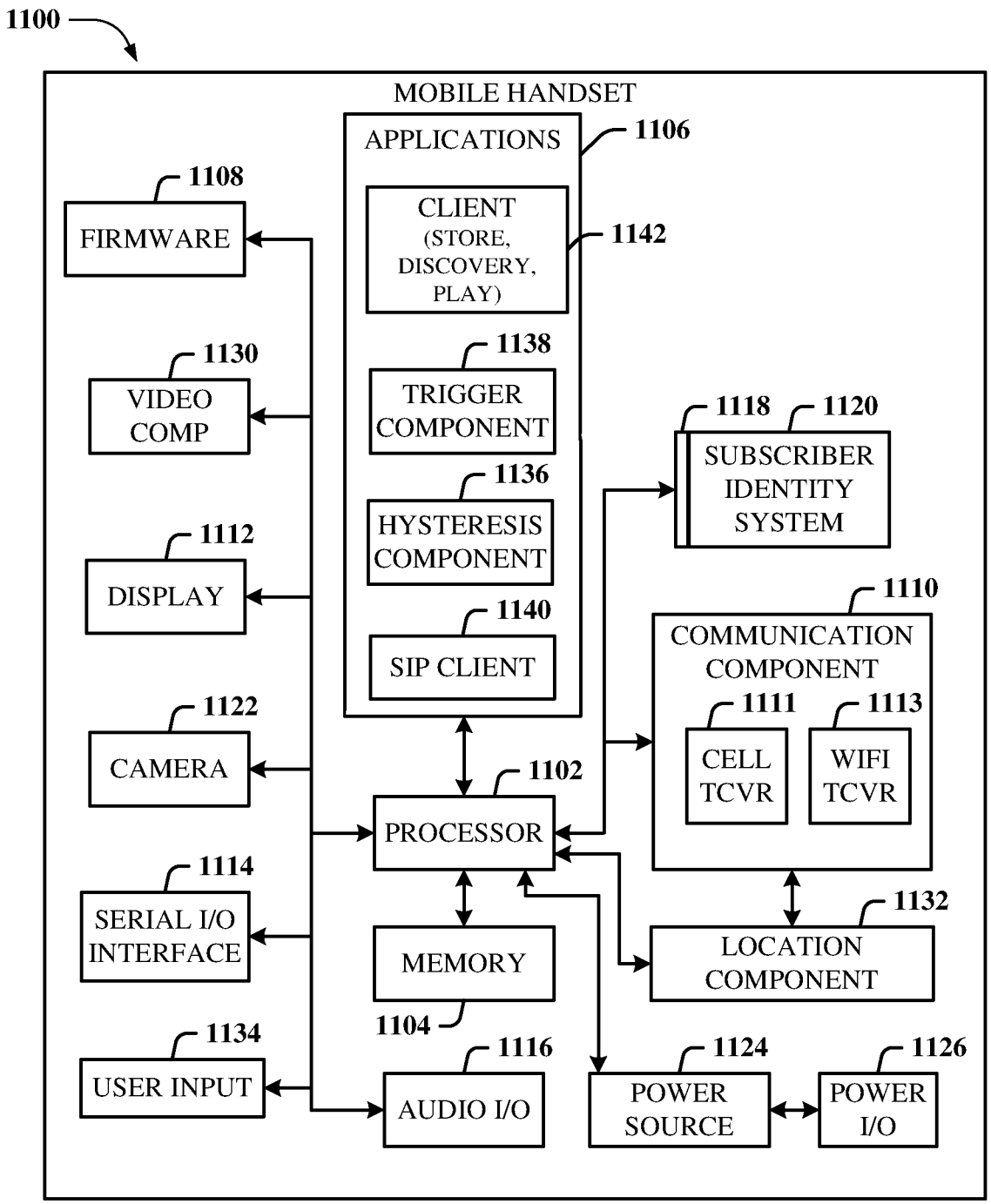
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1000, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
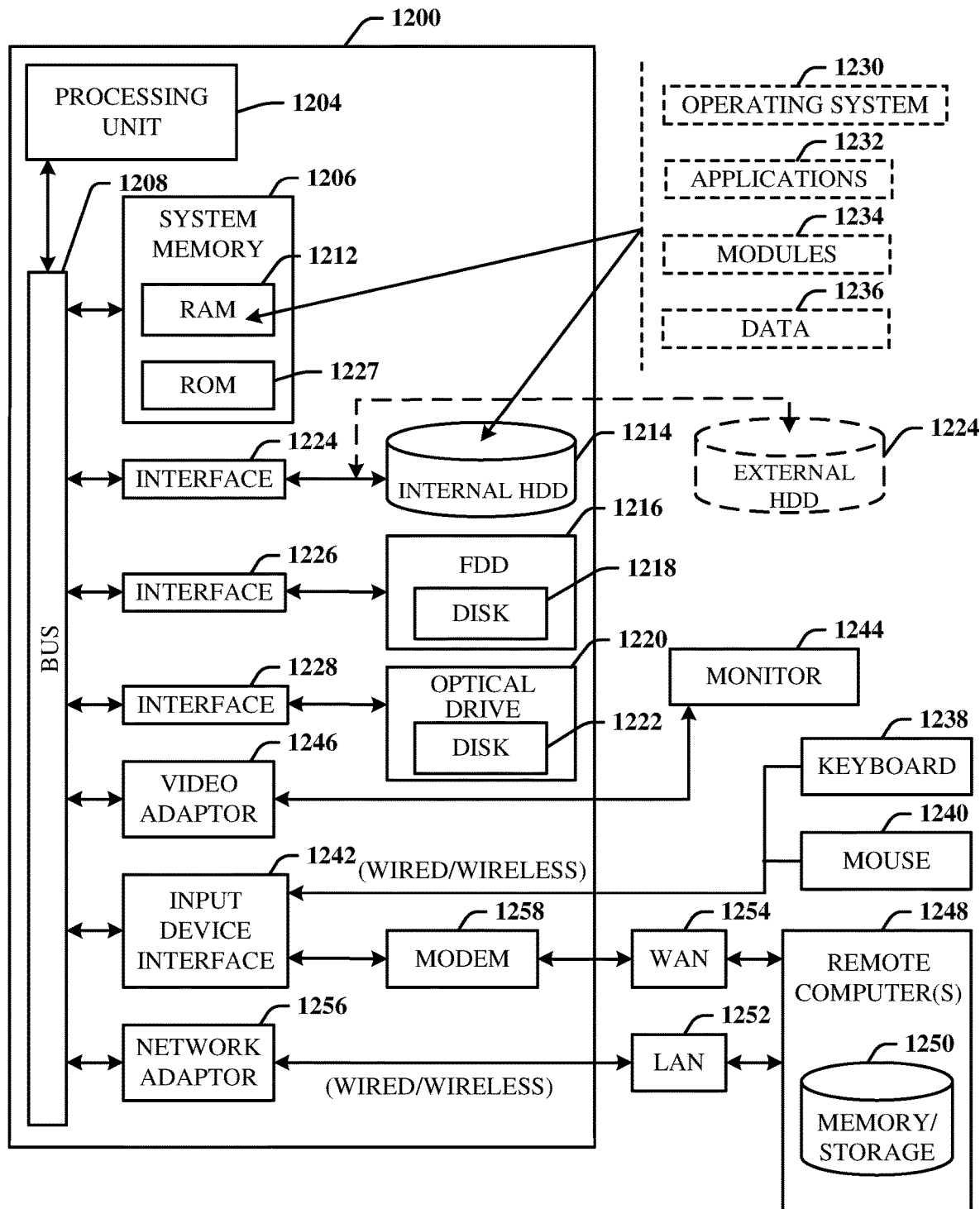
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) can include a microphone, an IR remote control, a joystick, a game pad, a stylus pen, touchscreen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1200 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
  scheduling, by network equipment comprising a processor, a first data traffic channel and a second data traffic channel for a user equipment, wherein the scheduling of the first data traffic channel is based on a single codeword scheduling procedure, and wherein the scheduling of the second data traffic channel is based on an iterative procedure; and
  transmitting, by the network equipment to the user equipment, first data via the first data traffic channel, second data via the second data traffic channel, first control information via a first control channel, and second control information via a second control channel, wherein the first control information is related to the first data traffic channel, and wherein the second control information is related to the second data traffic channel.

2. The method of claim 1, wherein the scheduling of the second data traffic channel comprises:
  using, as a current modulation and coding scheme for the second data traffic channel, a lowest modulation and coding scheme selected from a group of modulation and coding schemes of a modulation and coding scheme set.

3. The method of claim 1, wherein the second data traffic channel uses a first modulation and coding scheme, and wherein the method further comprises:
  based on a hybrid automatic repeat request status determined after expiration of a defined time interval, determining a second modulation and coding scheme for the second data traffic channel.

4. The method of claim 1, wherein the second data traffic channel uses a first modulation and coding scheme, and wherein the method further comprises:
- based on a hybrid automatic repeat request status determined after expiration of a defined time interval, determining that a value associated with a pass criterion applicable to a hybrid automatic repeat request is less than a defined threshold; and
- changing to a second modulation and coding scheme from the first modulation and coding scheme, wherein the second modulation and coding scheme comprises the first modulation and coding scheme minus 1.

5. The method of claim 4, further comprising:
- prior to the determining, receiving a hybrid automatic repeat request negative acknowledgement from the user equipment, wherein the hybrid automatic repeat request negative acknowledgement is the hybrid automatic repeat request status.

6. The method of claim 1, wherein the second data traffic channel uses a first modulation and coding scheme, and wherein the method further comprises:
- based on a hybrid automatic repeat request status determined after expiration of a defined time interval, determining that a value associated with a pass criterion applicable to a hybrid automatic repeat request is more than a defined threshold; and
- changing to a second modulation and coding scheme from the first modulation and coding scheme, wherein the second modulation and coding scheme comprises the first modulation and coding scheme plus 1.

7. The method of claim 6, further comprising:
- prior to the changing, receiving a hybrid automatic repeat request acknowledgement from the user equipment, wherein the hybrid automatic repeat request acknowledgement is the hybrid automatic repeat request status.

8. The method of claim 1, wherein the transmitting of the first control information via the first control channel and the second control information via the second control channel is performed at substantially a same time.

9. The method of claim 1, wherein the first control channel and the second control channel are configured to operate according to a fifth generation communication protocol.

10. A system, comprising:
- a processor; and
- a memory that stores executable instructions that, when executed by the processor, facilitate performance of operations, comprising:
  - scheduling a first data traffic channel and a second data traffic channel for a user equipment, wherein the scheduling of the first data traffic channel is based on a single codeword scheduling procedure, and wherein the scheduling of the second data traffic channel is based on an iterative procedure; and
  - sending, to the user equipment, first data via the first data traffic channel, second data via the second data traffic channel, first control information via a first control channel, and second control information via a second control channel, wherein the first control information is related to the first data traffic channel, and wherein the second control information is related to the second data traffic channel.

11. The system of claim 10, wherein the scheduling of the second data traffic channel comprises:
- selecting, from a data structure representing a group of modulation and coding schemes, a lowest modulation and coding scheme; and
- using the lowest modulation and coding scheme for the second data traffic channel.

12. The system of claim 10, wherein the second data traffic channel comprises a first modulation and coding scheme, and wherein the operations further comprise:
- determining that a value based on evaluation of a pass criterion related to a hybrid automatic repeat request is less than a defined threshold; and
- updating from the first modulation and coding scheme to a second modulation and coding scheme, wherein the second modulation and coding scheme comprises the first modulation and coding scheme minus one.

13. The system of claim 12, wherein the operations further comprise:
- prior to the determining, receiving a negative acknowledgement from the user equipment in response to a hybrid automatic repeat request status sent to the user equipment.

14. The system of claim 12, wherein the operations further comprise:
- prior to the determining, receiving an acknowledgement from the user equipment in response to a hybrid automatic repeat request status sent to the user equipment.

15. The system of claim 10, wherein the second data traffic channel comprises a first modulation and coding scheme, and wherein the operations further comprise:
- determining that a value based on evaluation of a pass criterion related to a hybrid automatic repeat request is more than a defined threshold; and
- updating from the first modulation and coding scheme to a second modulation and coding scheme, wherein the second modulation and coding scheme comprises the first modulation and coding scheme plus one.

16. The system of claim 10, wherein the sending of the first control information via the first control channel and the second control information via the second control channel is performed concurrently.

17. A non-transitory machine-readable medium, comprising executable instructions that, when executed by a processor, facilitate performance of operations, comprising:
- transmitting, to a user equipment, first information via a first data traffic channel and second information via a second data traffic channel, wherein the first data traffic channel is scheduled based on a single codeword scheduling procedure, and wherein the second data traffic channel is scheduled based on an iterative process; and
- transmitting, to the user equipment, first control information indicative of the first data traffic channel via a first control channel and second control information indicative of the second data traffic channel via a second control channel.

18. The non-transitory machine-readable medium of claim 17, wherein the transmitting of the first control information and of the second control information is performed simultaneously or substantially simultaneously.

19. The non-transitory machine-readable medium of claim 17, wherein the second data traffic channel comprises a first modulation and coding scheme, and wherein the operations further comprise:
- determining that a value based on evaluation of a pass criterion related to a hybrid automatic repeat request is more than a defined threshold; and
- updating from the first modulation and coding scheme to a second modulation and coding scheme, wherein the second modulation and coding scheme comprises the first modulation and coding scheme plus one.

20. The non-transitory machine-readable medium of claim 17, wherein the scheduling of the second data traffic channel comprises:
- selecting, from a data structure representing a group of modulation and coding schemes, a modulation and coding scheme determined to be one level lower than a current modulation and coding scheme, resulting in a selected modulation and coding scheme; and
- using the selected modulation and coding scheme for the second data traffic channel.

* * * * *